W. H. HIGGS.
SLICING GAGE.
APPLICATION FILED MAY 17, 1920.
1,356,067.
Patented Oct. 19, 1920.
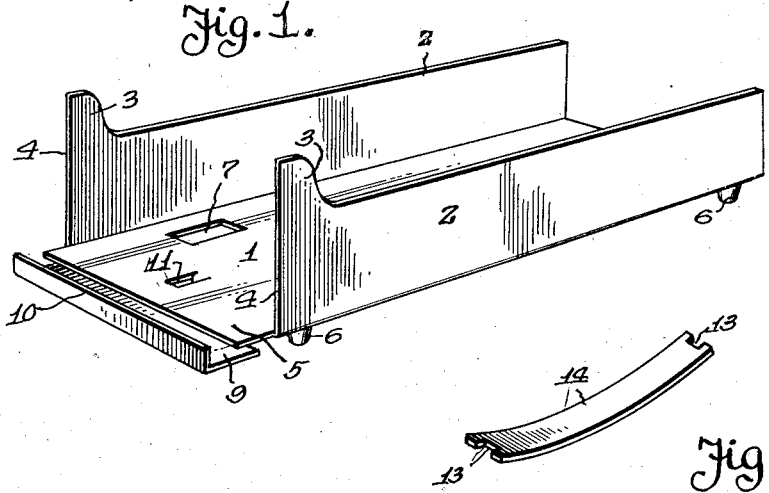
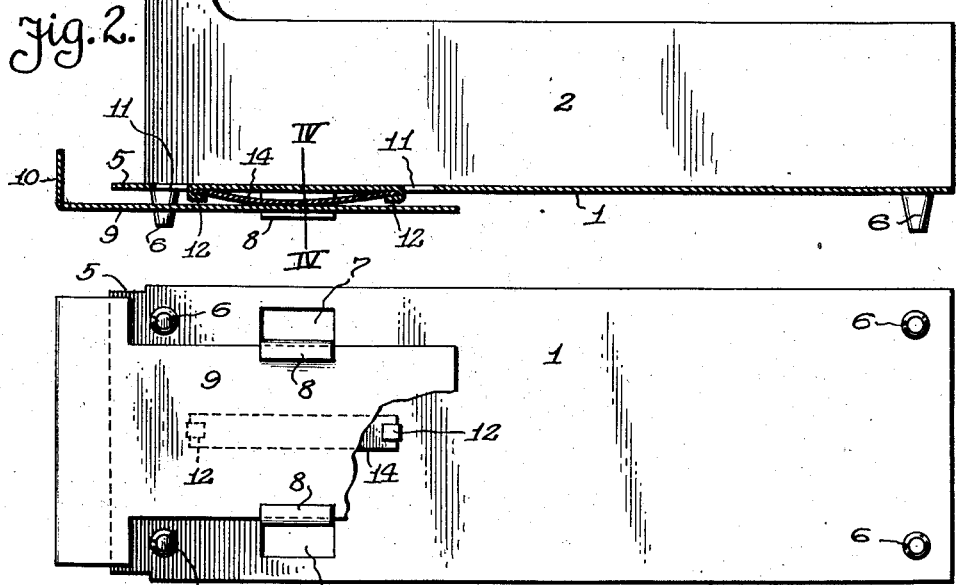
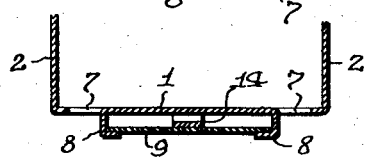
Inventor
William H. Higgs,
By
Attorneys

UNITED STATES PATENT OFFICE.

WILLIAM H. HIGGS, OF DETROIT, MICHIGAN.

SLICING-GAGE.

1,356,067.　　　　Specification of Letters Patent.　　Patented Oct. 19, 1920.

Application filed May 17, 1920. Serial No. 381,823.

*To all whom it may concern:*

Be it known that I, WILLIAM H. HIGGS, a citizen of the United States of America, residing at Detroit, in the county of Wayne and State of Michigan, have invented certain new and useful Improvements in Slicing-Gages, of which the following is a specification, reference being had therein to the accompanying drawings.

This invention relates to a slicing gage that may be advantageously used for evenly and uniformly slicing bread, butter, cheese, and other edibles that are of loaf or oblong form.

My invention aims to provide a simple, durable and sanitary holder for a loaf of bread, the holder being substantially channel or trough shape, so as to afford a guide that will brace a loaf of bread while its end is being sliced, and to insure slices of a uniform thickness being removed from the loaf of bread the end of the holder has an adjustable abutment or gage which may be positioned relative to the end of the holder to limit the advancement of a loaf of bread in the holder, so that when an ordinary bread knife is used for slicing the slices will be of uniform thickness.

The mechanical construction entering into the holder will be hereinafter considered and then claimed, and reference will now be had to the drawing, wherein—

Figure 1 is a perspective view of the holder;

Fig. 2 is a longitudinal sectional view of the same;

Fig. 3 is a bottom plan of the holder, partly broken away;

Fig. 4 is a cross sectional view taken on the line IV—IV of Fig. 2, and

Fig. 5 is a perspective view of a detached gage spring.

The slicing gage and bread holder is preferably made of sheet metal bent to form and finished to present a neat appearance and at the same time be sanitary throughout with the parts of the holder assembled so as to be easily separated and thoroughly cleaned. The holder is substantially channel shaped and comprises a bottom wall 1 having longitudinal parallel upstanding side walls 2 throughout the length thereof, and said side walls have vertical extensions 3 at one end thereof coöperating with said side walls in providing knife guiding edges 4.

The bottom wall 1 has a horizontal ledge 5 at its outer end, and said bottom wall has depending legs or pegs 6 at both ends so that the bottom wall may be supported in an elevated position relative to a table top or other support and thus provide sufficient clearance under the bottom wall for a slicing gage or adjustable abutment. The legs or pegs 6 may be made of yieldable or cushioning material, for instance, hard rubber, and suitably connected to the bottom wall 1.

The bottom wall 1, adjacent its outer end and in proximity to the side walls 2, is cut and stamped, as at 7 with the stamped material bent downwardly under the bottom wall 1 to form angle guides 8 for the tongue 9 of an angle gage or abutment 10 which may be shifted relative to the ledge 5 with the tongue 9 moving in a plane parallel to the bottom wall 1. The angle gage or abutment 10 extends above the plane of the ledge 5 and is adapted to limit the movement of the loaf of bread on said ledge, said gage or abutment coöperating with the knife guiding edges 4 of the holder in determining the thickness of a slice of bread to be removed from the loaf.

The bottom wall 1 is additionally cut and stamped, as at 11 and the stamped out material bent downwardly to afford lugs 12 for loosely holding the notched or slotted ends 13 of a comparatively flat or bowed spring 14 which bears on the tongue 9 of the gage or abutment and frictionally holds the tongue 9 on the guides 8. The pressure of the spring 14 on the tongue 9 prevents accidental shifting of the gage or abutment as the loaf of bread is brought into engagement therewith, yet it is possible to manually adjust the gage or abutment relative to the ledge 5. It is obvious that the ledge 5 may be provided with a strip or cover of any material that will prevent a knife cutting edge from being injured by contacting with the ledge, also that one or both of the side edges of the gage or abutment may be graduated to permit of the gage being adjusted for a slice of bread of desired thickness.

While in the drawing there is illustrated a preferred embodiment of my invention, it is to be understood that the structural elements are susceptible to such changes, in size, shape and manner of assemblage, as fall within the scope of the appended claims.

What I claim is:—

1. A device of the class described comprising a channel holder having a bottom wall cut and stamped to provide guides and lugs, a slicing gage slidable on the guides of the holder bottom wall and movable to and from the end of said holder, and means held in place by the lugs of the holder bottom wall and engaging said gage to frictionally hold said gage in an adjusted position.

2. A device as characterized in claim 1, wherein said means is in the form of a bowed spring between said gage and the holder bottom wall with the ends of said spring notched and loosely held by the holder bottom wall lugs.

In testimony whereof I affix my signature in the presence of two witnesses.

WILLIAM H. HIGGS.

Witnesses:
KARL H. BUTLER,
ANNA M. DORR.